(12) United States Patent
Heinlein

(10) Patent No.: US 7,000,742 B2
(45) Date of Patent: Feb. 21, 2006

(54) FORCE TRANSMISSION DEVICE FOR A DISC BRAKE

(75) Inventor: Carl Edward Heinlein, Newport (GB)

(73) Assignee: Meritor Heavy Braking Systems (UK) Ltd., Gwent (GB)

(*) Notice: Subject to any disclaimer, the term of this patent is extended or adjusted under 35 U.S.C. 154(b) by 0 days.

(21) Appl. No.: 10/763,804

(22) Filed: Jan. 23, 2004

(65) Prior Publication Data
US 2004/0163899 A1    Aug. 26, 2004

(30) Foreign Application Priority Data
Jan. 25, 2003  (GB)  .................................... 0301798

(51) Int. Cl.
F16D 55/08   (2006.01)
F16D 55/16   (2006.01)

(52) U.S. Cl. .................... 188/72.9; 188/72.8; 188/71.9

(58) Field of Classification Search ............... 188/71.1, 188/71.7, 71.8, 71.9, 72.1, 72.7, 72.8, 72.9, 188/73.1
See application file for complete search history.

(56) References Cited

U.S. PATENT DOCUMENTS

| 5,829,557 | A | * | 11/1998 | Halasy-Wimmer et al. . 188/162 |
| 6,000,507 | A | * | 12/1999 | Bohm et al. ................. 188/158 |
| 6,073,732 | A | * | 6/2000 | Angerfors .................. 188/71.9 |
| 6,158,558 | A | * | 12/2000 | Bill et al. .................... 188/162 |
| 6,250,437 | B1 | * | 6/2001 | Wang ......................... 188/72.5 |
| 6,269,914 | B1 | * | 8/2001 | Angerfors .................. 188/71.9 |
| 6,325,182 | B1 | * | 12/2001 | Yamaguchi et al. ....... 188/72.8 |
| 6,435,319 | B1 | | 8/2002 | Thomas et al. |
| 6,607,059 | B1 | * | 8/2003 | Kapaan et al. ............. 188/72.8 |
| 6,634,468 | B1 | * | 10/2003 | Ortegren et al. ........... 188/71.1 |

FOREIGN PATENT DOCUMENTS

EP    0 852 301    7/1998

OTHER PUBLICATIONS

European Search Report dated May 12, 2004.

* cited by examiner

Primary Examiner—Devon C. Kramer
(74) Attorney, Agent, or Firm—Carlson, Gaskey & Olds

(57) ABSTRACT

A force transmission device for a disc brake is operable to move a friction element of the brake into engagement with a rotary brake disc along a first axis in response to a loading from a thrust member. The device is restrained from movement transverse to the first axis near a first end engageable with the thrust member, but is unguided near a second end engageable with the friction element.

8 Claims, 5 Drawing Sheets

FORCE TRANSMISSION DEVICE FOR A DISC BRAKE

REFERENCE TO RELATED APPLICATIONS

This application claims priority to United Kingdom Patent Application GB 0301798.5 filed on Jan. 25, 2003.

BACKGROUND OF THE INVENTION

The present invention relates generally to a disc brake incorporating a force transmission device.

Force transmission devices of disc brakes, particularly air actuated disc brakes, are mounted within a caliper of a brake and transmit an actuation force from an actuator to friction elements of the brake via tappets or pistons. Typically, the force transmission devices includes an adjuster mechanism that compensates for wear of the friction elements.

There are several drawbacks to known force transmission devices. For one, the high number of metal-to-metal sliding surfaces reduce efficiency. Additionally, the machining process used to provide a close fit between the tappet shafts and the housings is relatively expensive. The seals located near to the rear of the friction element may also be damaged in extreme high temperature applications. Furthermore, since the tappet heads are individual components, they must be securely attached to the tappet shafts, usually by a retaining ring or a circlip, increasing the number of parts. Finally, although cast iron backplates for friction elements are becoming more common, machining the backplate to ensure that the backplate is flat and the load from the force transmission device is adequately distributed over the backplate is expensive.

SUMMARY OF THE INVENTION

The present invention seeks to overcome, or at least mitigate, the problems of the prior art.

The present invention provides a force transmission device for a disc brake operable to move a friction element of the brake along a first axis into engagement with a rotary brake disc in response to a loading from a thrust member. A first end of the device is engageable with the thrust member, and a second end of the device is engageable with the friction element. The device is restrained near the first end from movement transverse to the first axis. The device is unguided near the second end of the device.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

Figure 1:
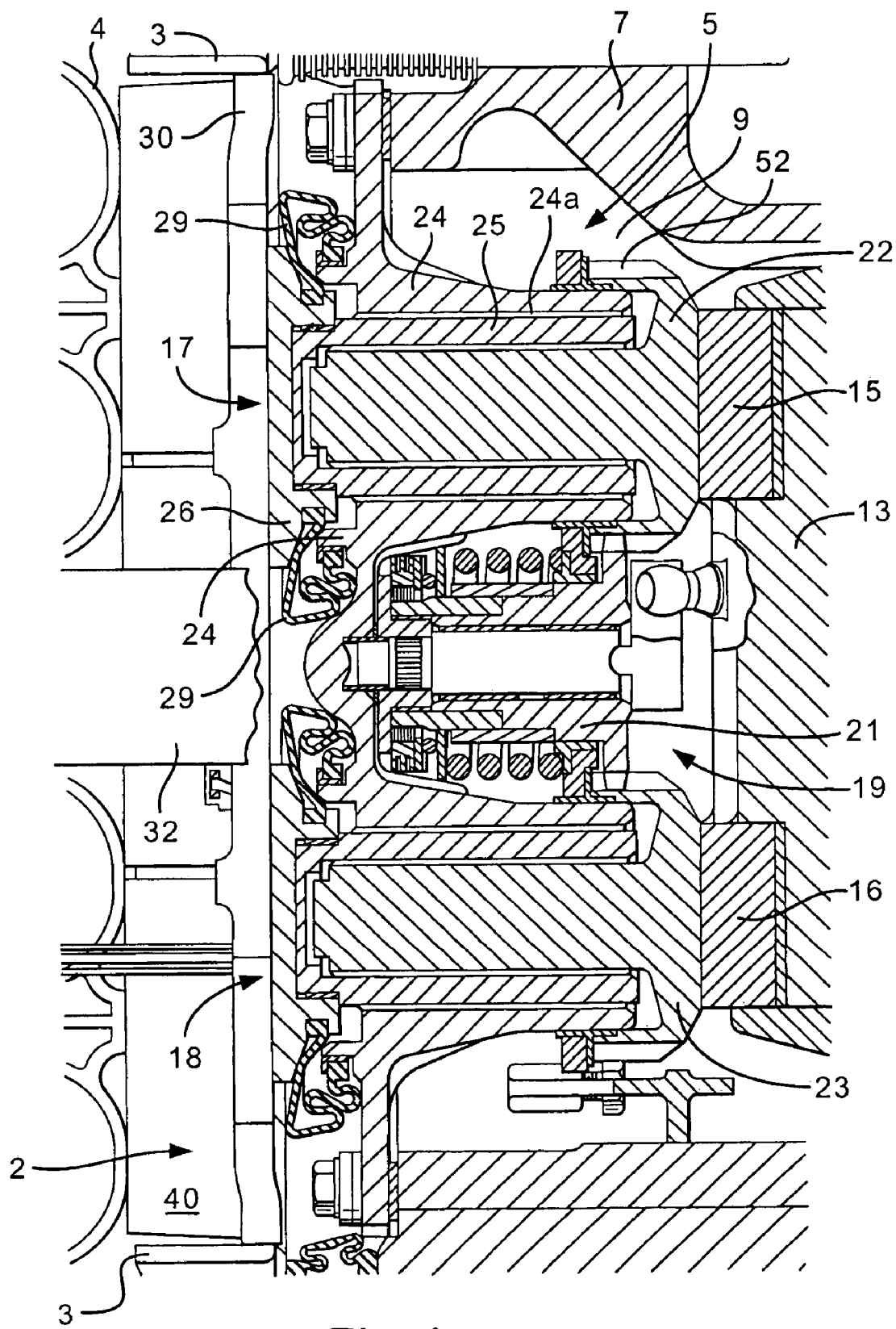
FIG. 1 schematically illustrates a cross-sectional view through a portion of a prior art disc brake incorporating a prior art force transmission device.
Figure 2:
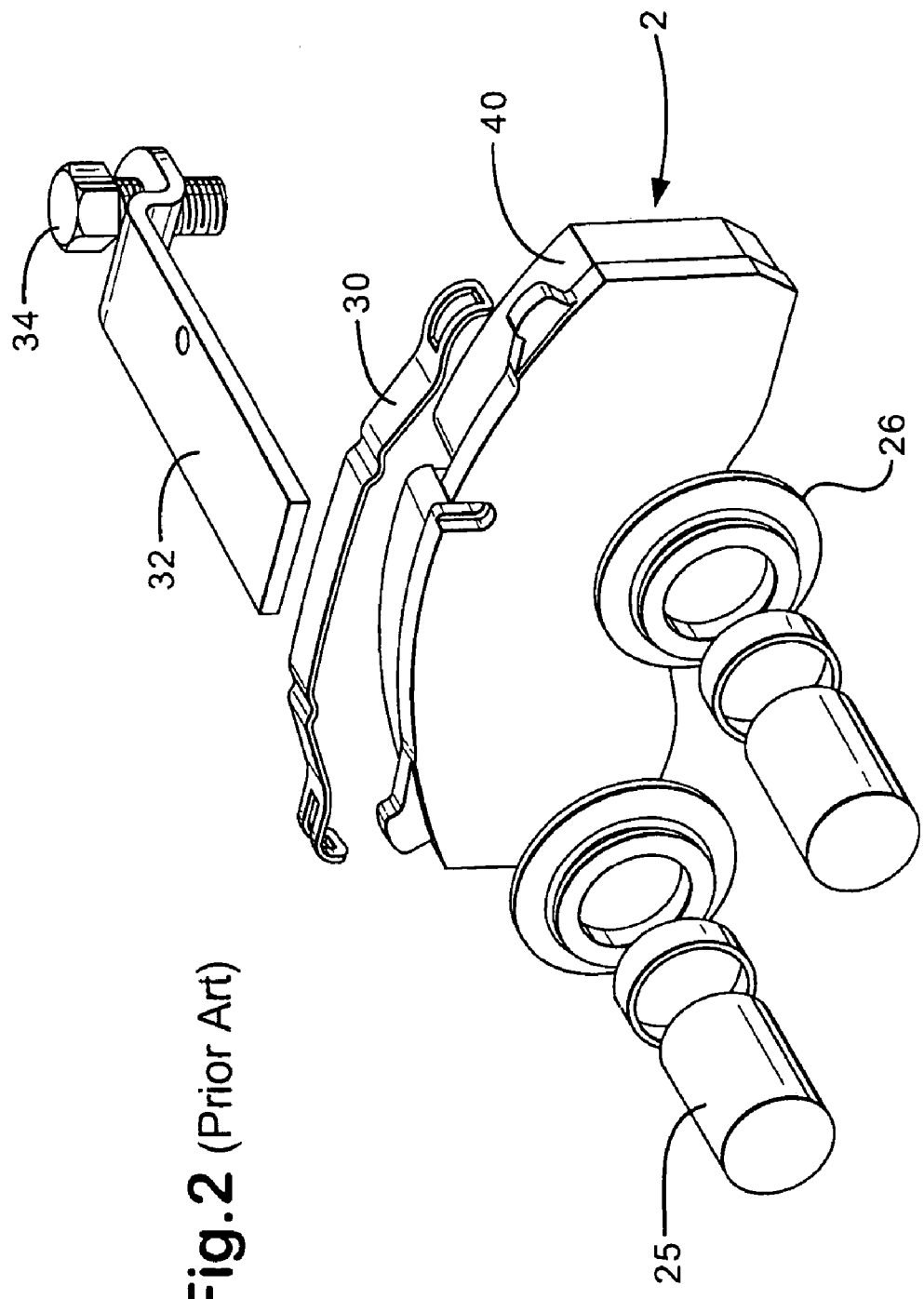
FIG. 2 schematically illustrates an exploded perspective view of a prior art friction element and a portion of the force transmission device.

FIGS. 1 and 2 illustrates a prior art force transmission device 5 mounted within a chamber 9 of a housing 7 of a disc brake caliper. The housing 7 is adapted to mount a conventional air or other power actuator (not shown) on an external face of the housing 7. An actuating lever (not shown) may perform an angular reciprocal swinging movement under the action of a thrust member of the power actuator. The lever can be integral or attached to a rotary actuating member 13 rotatably supported within the caliper. The rotary actuating member 13 is recessed to house respective cylindrical rollers 15 and 16 having axes offset from the rotary axis of the rotary actuating member 13 to form an eccentric, actuating arrangement. The cylindrical rollers 15 and 16 bear against respective appet assemblies 17 and 18 (shown as adjustable tappet assemblies) of the force transmission device 5.

Rotation of the lever and the rotary actuation member 13 causes the tappet assemblies 17 and 18 to apply an actuating thrust to a directly actuated friction element 2 and, by reaction via the caliper, to an indirectly actuated friction element (not shown). The friction elements 2 are mounted to face respective sides of a brake disc or rotor 4. The friction elements 2 are received within openings in a brake carrier 3 and fixed to a non-rotatable portion of a vehicle (e.g., the suspension) to which the brake is mounted. The friction elements 2 are restrained from circumferential and radial inward movement. Radial outward movement is restricted by pad springs 30 and a pad strap 32 held in place by fastener 34.

An adjuster assembly 19 may be of any appropriate conventional type and needs no detailed description. The adjuster responds to excessive movement of the friction element 2 (e.g., due to wear of the friction material 40) and produces resultant rotation of an adjuster shaft 21 via a gear 52, which in turn rotates a pair of adjuster shafts 22 and 23 of the restrictive adjustable tappet assemblies 17, 18.

The tappet assemblies 17 and 18 are of identical construction and operation, and therefore only the tappet assembly 17 will be described herein. The tappet assembly 17 includes a tappet housing 24 including a trilobular bore 24A. A tappet head 26 is mounted to a closed end portion of a tappet shaft 25 having a trilobular external surface received in and axially guided by the bore 24A. The tappet shaft 25 further includes a threaded internal bore arranged to receive the adjuster shaft 22 having a corresponding external thread. The tappet assemblies 17 and 18 are disposed with tappet heads 26 adjacent to the friction element 2.

When the brake actuator applies a force from the right as shown in FIG. 1, the entire tappet assembly 17 slides along the bore 24A to transmit the braking force to the friction element 2 via the tappet head 26. Because the friction element 2 is able to move radially outwardly and circumferentially, there may be some relative movement between the tappet head 26 and the friction element 2 in operation. To adjust the length of the tappet, the adjuster shaft 22 rotates to cause relative axial movement between the adjuster shaft 22 and the tappet shaft 25 by the mating threads. The trilobular configuration of the outer surface of the tappet shaft 25 within the bore 24A prevents rotation of the tappet shaft 25 relative to the housing 7, ensuring that rotation of the adjuster shaft 22 results in actual lengthening of the tappet assembly 17. A seal 29 between the tappet head 26 and tappet housing 24 prevents particles of dirt and debris from entering into the sliding interface between the triblobular outer surface of the tappet shaft 25 and bore 24A.

Figure 3:
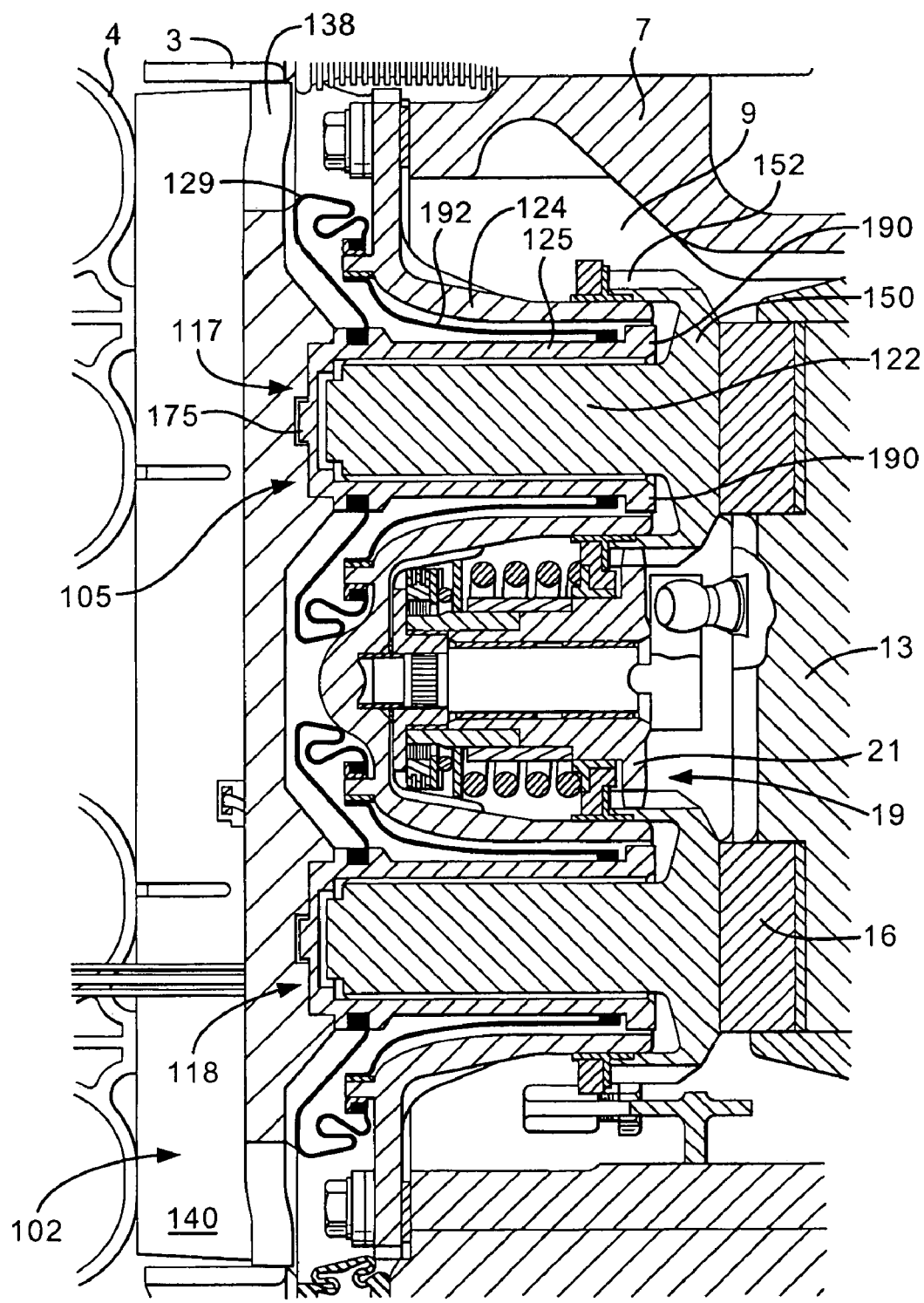
FIG. 3 schematically illustrates a cross-sectional view through a disc brake incorporating a force transmission device according to one embodiment of the present invention.
Figure 4:
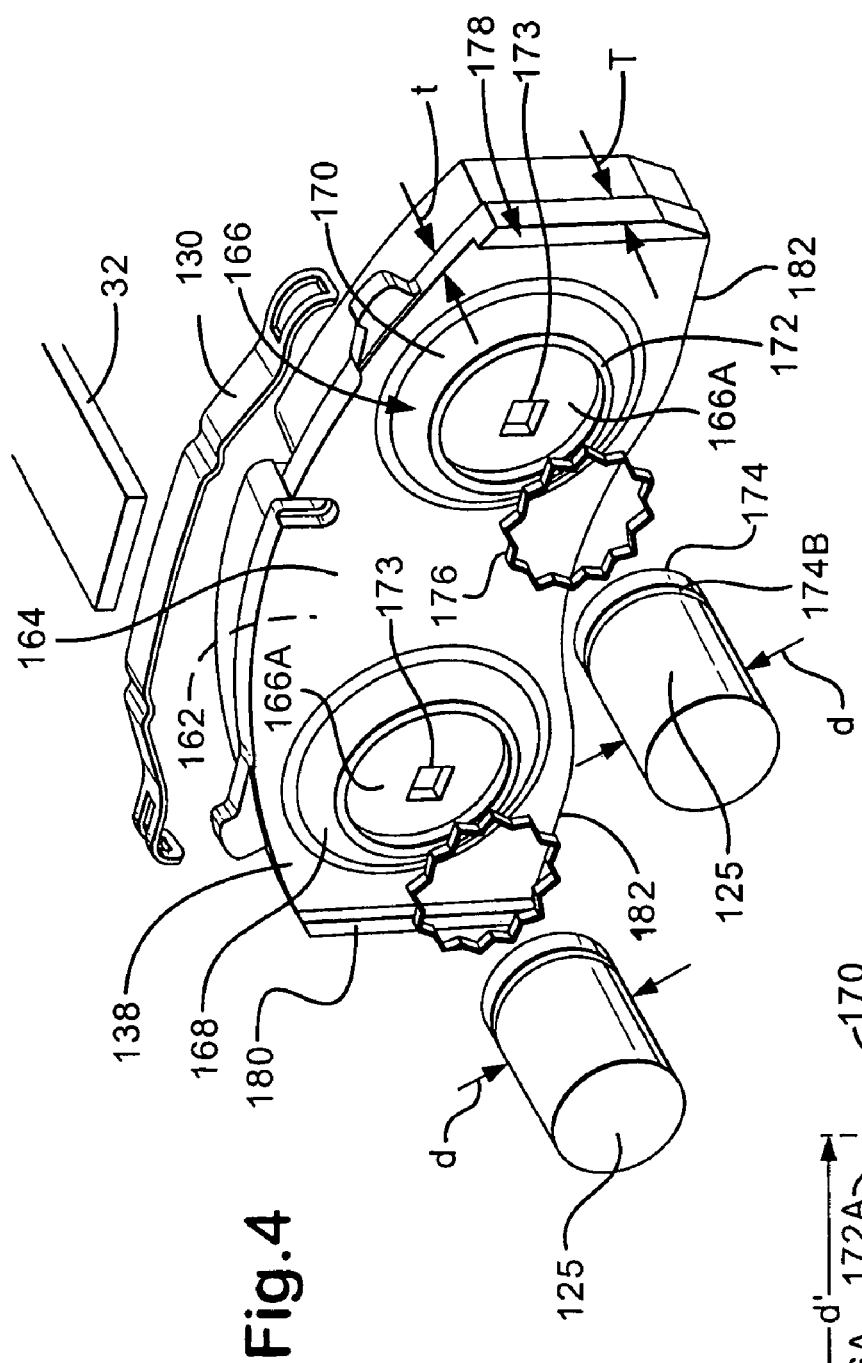
FIG. 4 schematically illustrates an exploded perspective view of a portion of the force transmission device and a friction element.

FIGS. 3 and 4 illustrate the force transmission device 105 of the present invention fitted within the chamber 9 of the housing 7 of a disc brake of the type disclosed above. The remaining parts of the disc brake identical with the prior art are designated by the same reference numerals and operate in the same way. The rotary actuating member 13 applies an actuating thrust via the tappet assemblies 117 and 118 to a directly actuated friction element 102. The tappet assemblies 117 and 118 are adjusted by an adjusted assembly 19.

The tappet housing 124 of the present invention does not include a trilobular bore arranged to receive and guide a tappet shaft along its axial length, and the prior art guidance for the tappet assemblies 117 and 118 is not needed. Instead, the end 150 of each tappet assembly 117 and 118 near the rotary actuating member 13 is guided by the interface of the gear ring 152 of the adjuster shaft 122 with the tappet housing 124. Therefore, no contact between the tappet housing 124 and the tappet shaft is necessary. The opposite end of each tappet assembly 117 and 118 is guided by a formation on the brake pad backplate 138 of the friction element 102.

Figure 5:
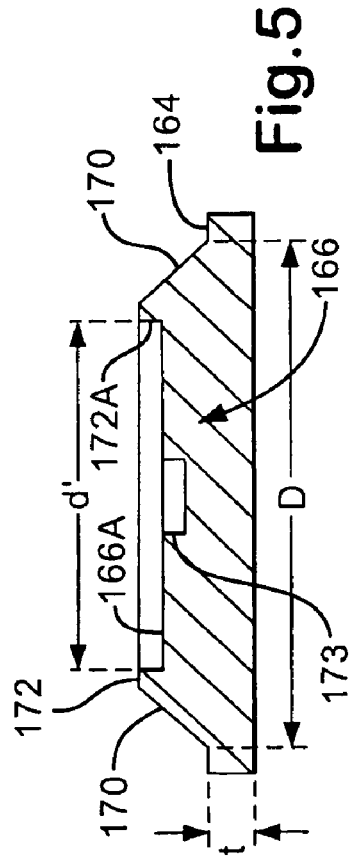
FIG. 5 schematically illustrates a cross-sectional view of the backplate of the friction element of FIG. 4.
Figure 6:
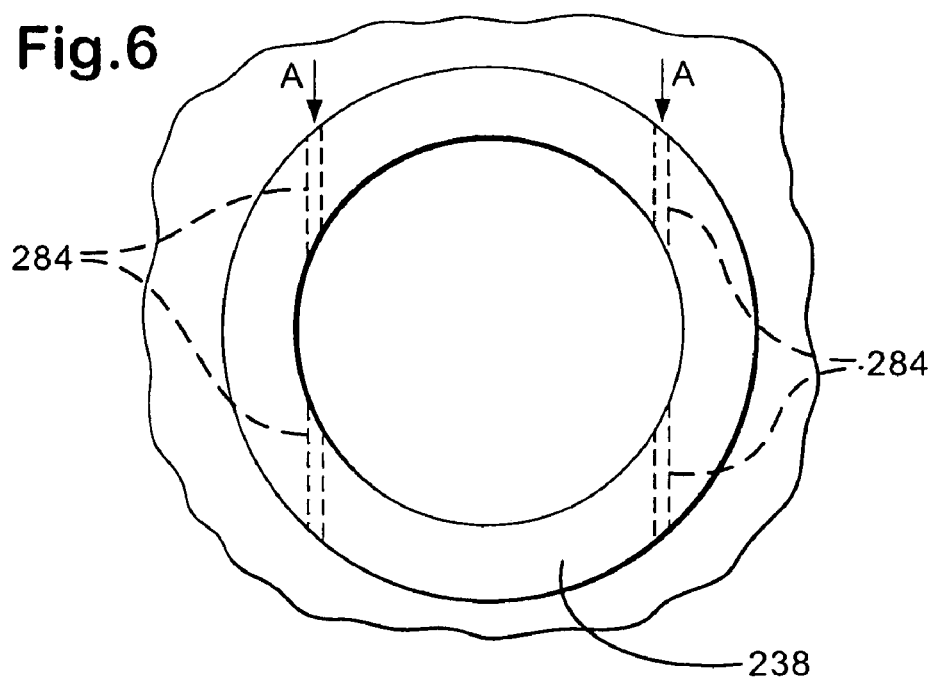
FIG. 6 schematically illustrates a second method of securing a tappet and backplate.

As shown in FIGS. 4 and 5, the brake pad backplate 138 is generally planar and has a friction material surface 162 on one side and a loading surface 164 on an opposite side. The loading surface 164 includes two identical local load spreading features in the form of raised bosses 166 and 168. Only boss 166 will be described, although it is to be understood that boss 168 is identical. The top of the boss 166 (as shown in FIG. 5) has a diameter d' which is smaller than the diameter D of the lower portion of the boss 166. Therefore, the boss 166 can act as a load spreading feature.

The boss 166 is circular and has a raised abutment and an edge 170 tapering towards the loading face 164. The raised abutment 172 is annular and has a diameter d' slightly larger than the diameter d of the tappet end 174 of the tappet shafts 125 and defines a surface 166A having a recessed square locating feature 173 at its center.

The tappet ends 174 have a substantially uniform circular cross section with a diameter d and a square end projection 175 dimensioned to fit within the recessed square locating feature 173. The tappet end 174 of the tappet shaft 125 includes an annular groove 174B. A resilient member, such as a wavy spring 176, is positioned in the annular groove 174B. The tappet shaft 125 and the wavy spring 176 are then inserted into the recessed square locating features 173 formed by the surface 166A and the raised abutment 172 such that the square end projection 175 fits within the recessed square locating feature 173. The assembly process can be achieved either by moving the brake pad toward the tappet shaft 125 or by moving the tappet shaft 125 toward the brake pad, as further described below.

The inner and outer friction element 102 of the prior art can be removed during servicing by simply removing the pad strap 32 and then moving the inner and outer friction element 102 in a radial direction relative to the brake disc.

The force transmission device of the present invention provides an alternative method of assembling the brake pad backplates 138, either during initial assembly or during reassembly following servicing. To assemble the brake pad backplate 138 in the outer position of the caliper, i.e., remote from the force transmission device, the friction element 102 has to be inserted in a radial direction and then subsequently moved in an axial direction, away from the brake disc or rotor 4, to engage the features of the brake pad backplate 138 with the features on the inner face of the bridge.

The wavy spring 176 is interference fitted in the recess formed by the surface 166A and ensures that the tappet end 174 of the tappet shaft 125 remains in contact with the surface 166A when the vehicle is in use. The wavy spring 176 also allows a limited amount of radial movement of the brake pad relative to the tappet shaft 125 (provided some clearance is provided between the square location feature 173 and the square end projection 175). The resilient nature of the wavy spring 176 can damp the transmission of vibrations induced in the friction element 102.

The wavy spring 176 is similar to proprietary components known as "tolerance rings." It is possible to design the piston and the brake pad backplate 138 to utilize "off the shelf" tolerance rings, rather than having a specific unique wavy spring 176. The wavy spring 176 is received in the annular groove 174B of the tappet shaft 125. However, in other embodiments, the annular groove 174B could be provided on the raised abutment 172. Since the tappet end 174 of the tappet shaft 125 is radially and circumferentially restrained by engagement with the brake pad backplate 138, the guidance provided by the bore 24A of prior art is no longer needed.

The brake pad backplate 138 is generally arcuate and has circumferential ends 178 and 180 that may be locally thicker (T) than the thickness (t) of the main portion of the brake pad backplate 138. The local thickening (T) ensures adequate engagement of the circumferential end 178 and 180 with the associated brake carrier 3, even at the extremes of friction element 102 and disc wear. Similar local thickening (not shown) can be provided on a radially inner edge 182 of the brake pad backplate 138 where it abuts the associated brake carrier 3.

When the brake pad backplate 138 is assembled in an inner position, i.e., in the position shown in FIG. 3, it is first moved in a radially inward direction and then in an axial direction away from the brake disc so that the location features of the brake pad backplate 138 engage with the tappet shaft 125.

An alternative method of assembling the brake pad backplate 138 into a caliper is to first move the brake pad backplates 138 in a radial direction such that the friction material 140 is near the brake disc surface and then to apply the brake so that the tappet shafts 125 and the inner face of the bridge approach and engage with the location features on the brake pad backplate 138 to prevent escape of the pads during subsequent normal use of the vehicle.

Figure 7:
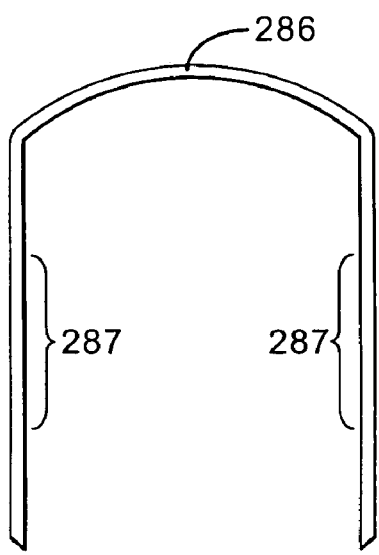
FIG. 7 schematically illustrates a third method of securing a tappet and backplate.
Figure 8:
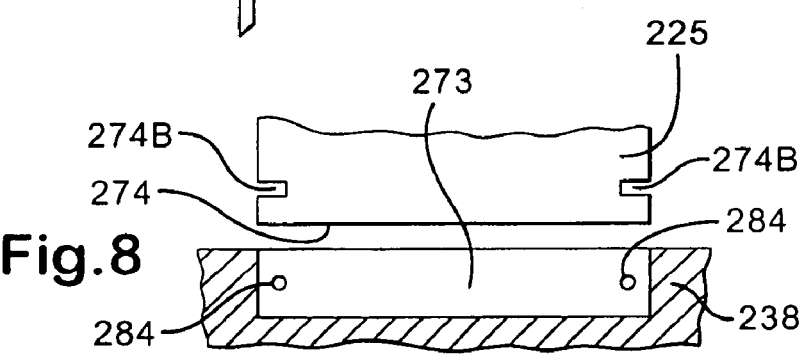
FIG. 8 schematically illustrates a fourth method of securing a tappet and backplate.

FIGS. 7 to 9 illustrate an alternative tappet shaft 225 having an end 274 and grooves 274B. The brake pad backplate 238 includes cordially orientated holes 284. The tappet shaft 225 is inserted into a recess 273, and a spring clip 286 is then inserted through the holes 284 in the direction of arrows A such that the regions 287 are received within the grooves 274B, retaining the piston to the brake pad. The grooves 274B preferably do not extend around the entire circumference of the tappet shaft 225 so that relative rotation of the tappet shaft 225 and the brake pad backplate 238 is prevented when the clip 286 is inserted.

Although the raised abutments 172 and the tappet ends 174 have been disclosed as circular, it is to be understood that non-circular formations can be employed. These formations would be a substitute for the square end projections 175 and the grooves 274B in enabling the wear adjustment assembly 19 to function properly. Any other suitable form of engagement that prevents relative rotation between the brake pad backplate 138 and the tappet shaft 125 may also be employed.

It is possible to rely solely on the interface between the tappet shafts 125 and the brake pad backplate 138 to ensure that the tappet assemblies 117 and 118 extend in response to wear of the friction material 140. However, it is also possible that the tappet shafts 125 may rotate once the brake pad backplate 138 is removed from the ends of the tappet shafts 125 and go out of mutual synchronism during pad replacement, potentially leading to difficulties in fitting a replacement pad and in achieving even wear of the friction material 102 during use of the disc brake. To prevent this, a further anti-rotation feature, such as teeth 190, may be provided near the rotary actuating member 13 at the end of the tappet shaft 125 to engage a complementary formation (not shown) on the tappet housing 124 when the tappet shaft 125 is in the retracted position with respect to the adjuster shaft 122, as illustrated in FIG. 3. Because the brake pad can only be replaced once the adjustment mechanism has been retracted, the teeth 190 are need to operate only in this position.

The force transmission device of the present invention also includes a secondary seal 192 extending between the housing 124 and the end of the tappet shaft 125 near the rotary actuating member 13. The secondary seal 192 prevents the ingress of certain debris into the force transmission device if the primary seal 129 fails.

The force transmission device of the present invention provides a number of advantages over the prior art. For example, the force transmission device provides for improved operational efficiency due to the reduced number of sliding contact points. Additionally, the cost of manufacturing the device may be reduced because there are fewer parts and because the need to machine both the tappet shaft and the bushing for the tappet shaft is eliminated. Furthermore, the force transmission device of the present invention provides additional savings in the manufacturing of cast backplates because only the contact area for locating the ends of the tappets require machining, rather than a large area of the backplate that accommodates prior art tappet heads or spreader plates.

It should be appreciated that numerous changes may be made within the scope of the present invention. For example, the force transmission device may be adapted for use with other adjuster mechanisms, such as those disclosed in WO 99/49232 and WO 97/01045. The present invention may further be applied to disc brakes that are fluid or mechanically actuated rather than air actuated and to non-floating caliper type disc brakes.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A caliper for a disc brake comprising:
a thrust member and a force transmission device, the force transmission device comprising, a first end engaged with the thrust member; second end engageable with a friction element and a middle portion disposed between said first end and said second end, wherein the force transmission device is operable along a first axis to move the friction element into engagement with a rotary brake disc in response to a loading from the thrust member, and wherein the force transmission device is restrained proximate the first end and the second end from movement transverse to the first axis and the middle portion of the force transmission device is unguided and unsupported by the caliper.

2. The caliper device according to claim 1 wherein the second end is remote from the first end, and the second end has a formation that engages the friction element and restricts relative movement therebetween in a direction transverse to the first axis so as to provide a further restraint.

3. The caliper according to claim 1 further including a housing that restrains movement at the first end transverse to the first axis.

4. A caliper for a disc brake comprising at least one tapper having a first end engageable with a thrust member; and a second end engageable with a friction element, the at least one tappet being operable along a first axis to move the friction element into engagement with a rotary brake disk in response to a loading from the thrust member, wherein the at least one tappet includes a tappet shaft and an adjuster shaft and is extendable by relative rotation of the tappet shaft and the adjuster shaft and further includes an end formation for engagement with a friction element to restrict rotation of one of the tappet shaft and the adjuster shaft to permit the at least one tappet to extend, the caliper further comprising a cooperating formation between a housing and one of the tappet shaft and the adjuster shaft to prevent relative rotation between the housing and the one of the tappet shaft and the adjuster shaft of the at least one tappet when in a retracted position only.

5. The caliper according to claim 4 wherein the cooperating formation includes a non-circular portion of the friction element and a complementary non-circular portion of said at least one tappet, and the non-circular portion of the friction element engages the complementary non-circular portion of said at least one tappet.

6. The caliper according to claim 4 wherein the cooperating formation is a plurality of teeth.

7. A disc brake caliper assembly comprising:
a friction element;
a housing including a chamber;
a thrust member mounted within the chamber; and
a force transmission device mounted within the chamber, the force transmission device including a first end in engagement with the thrust member, a second end in non-rotatable engagement with the friction element and a middle portion disposed between the first end and the second end,
the force transmission device being operable along a first axis to move the friction element into engagement with a rotary brake disc in response to a loading from the thrust member in order to apply a braking force to the rotary brake disc,
wherein the force transmission device is restrained at the first end from movement transverse to the first axis and the engagement between the friction element and the force transmission device restrains movement of the second end transversely within the limit of movement of the friction element, and wherein the force transmission device is unguided and unsupported by the housing along the middle portion.

8. The disc brake caliper assembly according to claim 7, further comprising an adjuster mechanism to extend the force transmission device from a retracted position in which there is sufficient clearance to permit the friction element to be replaced with the caliper in a fitted state, and an extended position in which the adjuster mechanism has at least partially extended the force transmission device in order to maintain a substantially constant brake running clearance, the disc brake caliper assembly further comprising a cooperating formation between the housing and the force transmission device to prevent relative rotation between the housing and an element of the force transmission device when in a retracted position only.

* * * * *

UNITED STATES PATENT AND TRADEMARK OFFICE
CERTIFICATE OF CORRECTION

PATENT NO. : 7,000,742 B2  
APPLICATION NO. : 10/763804  
DATED : February 21, 2006  
INVENTOR(S) : Heinlein, Carl Edward Page 1 of 1

It is certified that error appears in the above-identified patent and that said Letters Patent is hereby corrected as shown below:

Cover Page, Section (73) Assignee:

Please add --Vehicle-- after "Meritor Heavy"

Signed and Sealed this

Twenty-fifth Day of July, 2006

JON W. DUDAS  
*Director of the United States Patent and Trademark Office*